United States Patent [19]
Talmadge

[11] Patent Number: 5,088,330
[45] Date of Patent: Feb. 18, 1992

[54] SQUARE WAVE EXCITATION OF A TRANSDUCER

[75] Inventor: Paul C. Talmadge, Ansonia, Conn.

[73] Assignee: Pitney Bowes Inc., Stamford, Conn.

[21] Appl. No.: 619,624

[22] Filed: Nov. 29, 1990

[51] Int. Cl.$^5$ .............................................. G10L 1/20
[52] U.S. Cl. ...................................................... 73/769
[58] Field of Search ........................ 73/763, 769–773; 331/65

[56] References Cited

U.S. PATENT DOCUMENTS

| | | | |
|---|---|---|---|
| 2,924,967 | 2/1960 | Gieseler | 73/769 |
| 3,354,703 | 11/1967 | Russell, Jr. et al. | 73/770 |
| 3,965,429 | 6/1976 | Roberts, III | 73/769 |
| 4,155,263 | 5/1979 | Frantz | 73/771 |

FOREIGN PATENT DOCUMENTS 0572668 9/1977 U.S.S.R. ................................ 73/769

OTHER PUBLICATIONS

Analog Devices; Linear Products Data Book; 1988; pp. 9-15, 9-16.

Horowitz, Paul et al.; The Art of Electronics, 2d ed.; 1989; p. 183.

*Primary Examiner*—Robert Raevis
*Attorney, Agent, or Firm*—Nathaniel Levin; Melvin J. Scolnick; Robert H. Whisker

[57] ABSTRACT

A device for measuring a physical quantity includes a transducer and circuitry for exciting the transducer with an a.c. square wave. The excitation circuitry includes two amplifiers, a switch and a resistor network. The excitation circuitry provides a plus one gain when the switch is in one position and a minus one gain when the switch is in a second position. A similar circuit synchronously demodulates the transducer's output signal. Another similar circuit synchronously demodulates the transducer excitation signal and provides a reference voltage to an analog-to-digital converter (ADC). The ADC converts the demodulated transducer ouptut signal into a binary word. Both demodulated signals are filtered before application to the ADC. An example of the device is a force-measuring device such as a weighing scale incorporating a strain gauge load cell.

15 Claims, 13 Drawing Sheets

SQUARE WAVE EXCITATION OF A TRANSDUCER

FIELD OF THE INVENTION

This invention relates to devices for measuring physical quantities and, more particularly, to such devices that include a transducer such as a strain gauge.

BACKGROUND OF THE INVENTION

Reference is made to copending patent application Ser. No. 07/619,579, filed Nov. 29, 1990, entitled "Circuit for Generating or Demodulating a Square Wave and Other Wave Forms", filed by the applicant of the present application and assigned to the assignee of the present application. The disclosure of said copending application Ser. No. 07/619,579 is hereby incorporated herein by reference.

It is well known to use transducers such as strain gauges, thermistors, or linear variable differential transformers (LVDT's) to measure such physical quantities as strain, displacement, position, temperature or force. Often an excitation signal is applied to the transducers and the quantity to be measured modulates the signal. The modulated signal is then detected, analyzed and/or quantified, etc. For example, it is known to use a strain gauge comprising a resistor bridge circuit for measuring a change in a physical dimension of a body. One common application of such a strain gauge is in the load cell of a weighing scale. In many cases, a constant d.c. voltage is applied to the bridge circuit and the output voltage is then processed to provide an indication of the physical strain to be measured. However, use of d.c. excitation is subject to a number of errors, arising from such causes as thermocouple effects, 1/f noise, d.c. drift in the electronic components and line noise pick-up.

It is also known to avoid these difficulties by exciting the bridge with a sinusoidal a.c. waveform. The bridge output is then amplified and synchronously demodulated, and the error-causing noise can then be removed by a low pass filter. However, a disadvantage of this approach is the relatively high cost for components required to generate and demodulate a sinusoid waveform with great precision.

SUMMARY OF THE INVENTION

According to the present invention a device for measuring a physical quantity includes a transducer and circuitry for exciting the transducer with a.c. voltage in the form of a square wave. According to one aspect of the invention the transducer is a strain gauge.

According to another aspect of the invention, the excitation circuitry includes a modulating circuit that has a first amplifying circuit for receiving an input potential, a second amplifying circuit for outputting an output potential, a resistor network, a switching circuit having a first position and a second position and a device for repeatedly driving the switching circuit between its first and second positions. The switching circuit is connected to the first amplifying circuit, the second amplifying circuit and the resistor network. Changes in the position of the switching circuit change the effective gain of at least one of the amplifying circuits. When the switching circuit is in its first position, the output potential is equal to the input potential. When the switching circuit is in its second position, the output potential is equal to minus one times the input potential. The driving device is timed to operate so that the output potential has the form of a square wave.

According to a further aspect, the invention includes a third amplifying circuit for amplifying an output signal of the strain gauge, a signal demodulating circuit for demodulating an output signal of the third amplifying circuit, an analog-to digital (A/D) converter that receives a demodulated output from the signal demodulating circuit and converts that output to a digital signal, and a reference demodulating circuit that provides a demodulated reference potential to the A/D converter.

According to still a further aspect of the invention, the modulating circuit, the signal demodulating circuit and the reference demodulating circuit are substantially identical.

The device of the subject invention avoids the disadvantages of d.c. excited transducers without the relatively expensive componentry required for precise generation and demodulation of a sinusoidal a.c. waveform. Other advantages of the invention will be apparent to those skilled in the art from consideration of the attached drawings and the detailed description set forth below.

DETAILED DESCRIPTION OF PREFERRED EMBODIMENTS OF THE SUBJECT INVENTION

Figure 1:
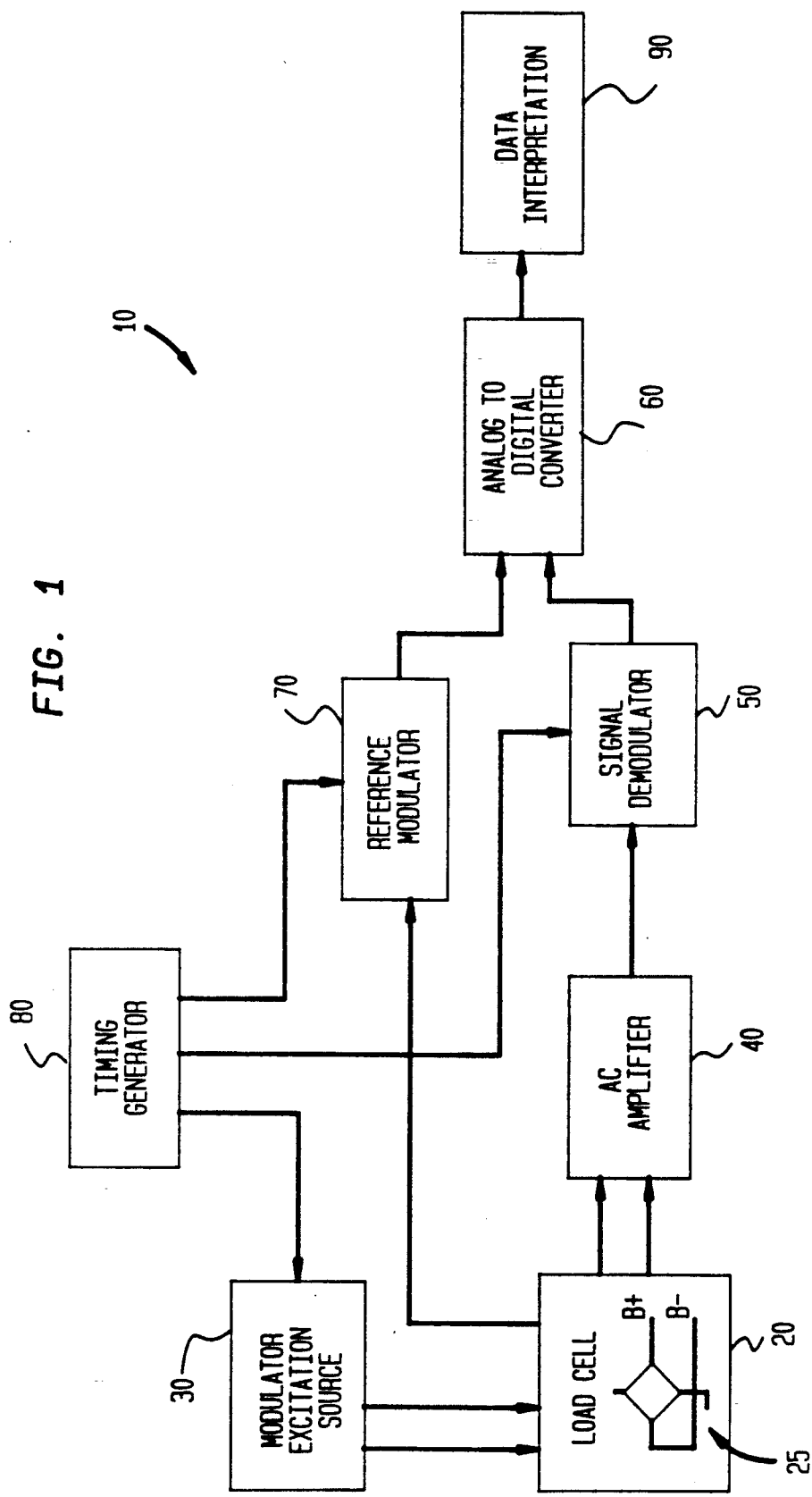
FIG. 1 is a schematic block diagram of the electronic circuitry of a force measuring apparatus according to the invention.

An overview will first be presented of a force-measuring device in accordance with the present invention. FIG. 1 shows in schematic form the major functional blocks of a force-measuring device 10. Device 10 includes load cell 20, which comprises one or more strain gauges arranged in a resistor bridge 25. Load cell 20 may, for example, be the model PW 2C3 available from Hottinger Baldwin Measurements, Inc., Marlboro, Mass. or the model 1040 available from Tedea, Inc., Canoga Park, Calif. Modulator excitation source 30 converts a precise, stable d.c. voltage into a square wave that is applied in a push-pull arrangement to resistor bridge 25.

The output of resistor bridge 25, reflecting the force applied to load cell 20, is amplified by a.c. amplifier 40, and then demodulated by signal demodulator 50. The d.c. signal output by signal demodulator 50 is converted into a digital signal by A/D converter 60. The reference voltage for A/D converter 60 is provided by reference demodulator 70, which demodulates the square wave excitation signal that is applied to resistor bridge 25.

Timing signals for modulator excitation source 30, signal demodulator 50 and reference demodulator 70 are provided by timing generator 80. The digital signal output by A/D converter 60 is received by data interpretation circuitry 90.

Figure 2:
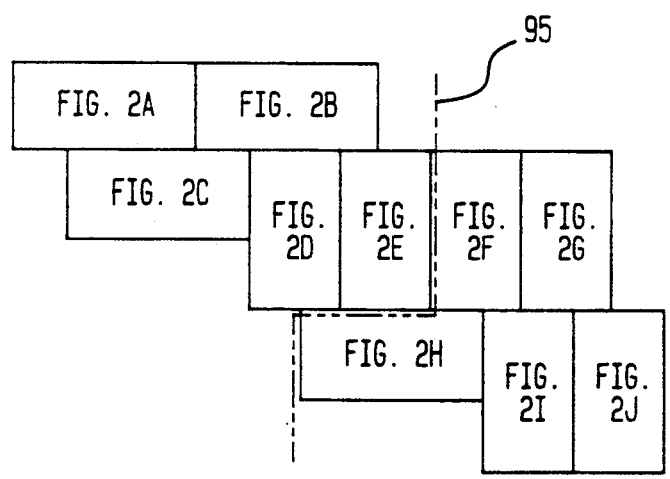
FIG. 2 is an interconnection diagram of FIGS. 2A–2J, which together are a schematic representation of the circuitry of FIG. 1.

FIGS. 2A-2J illustrate in more detail the circuitry of FIG. 1. (Dividing line 95 of FIG. 2 defines two convenient sub-groupings of FIGS. 2A-2J.)

Figure 2A:
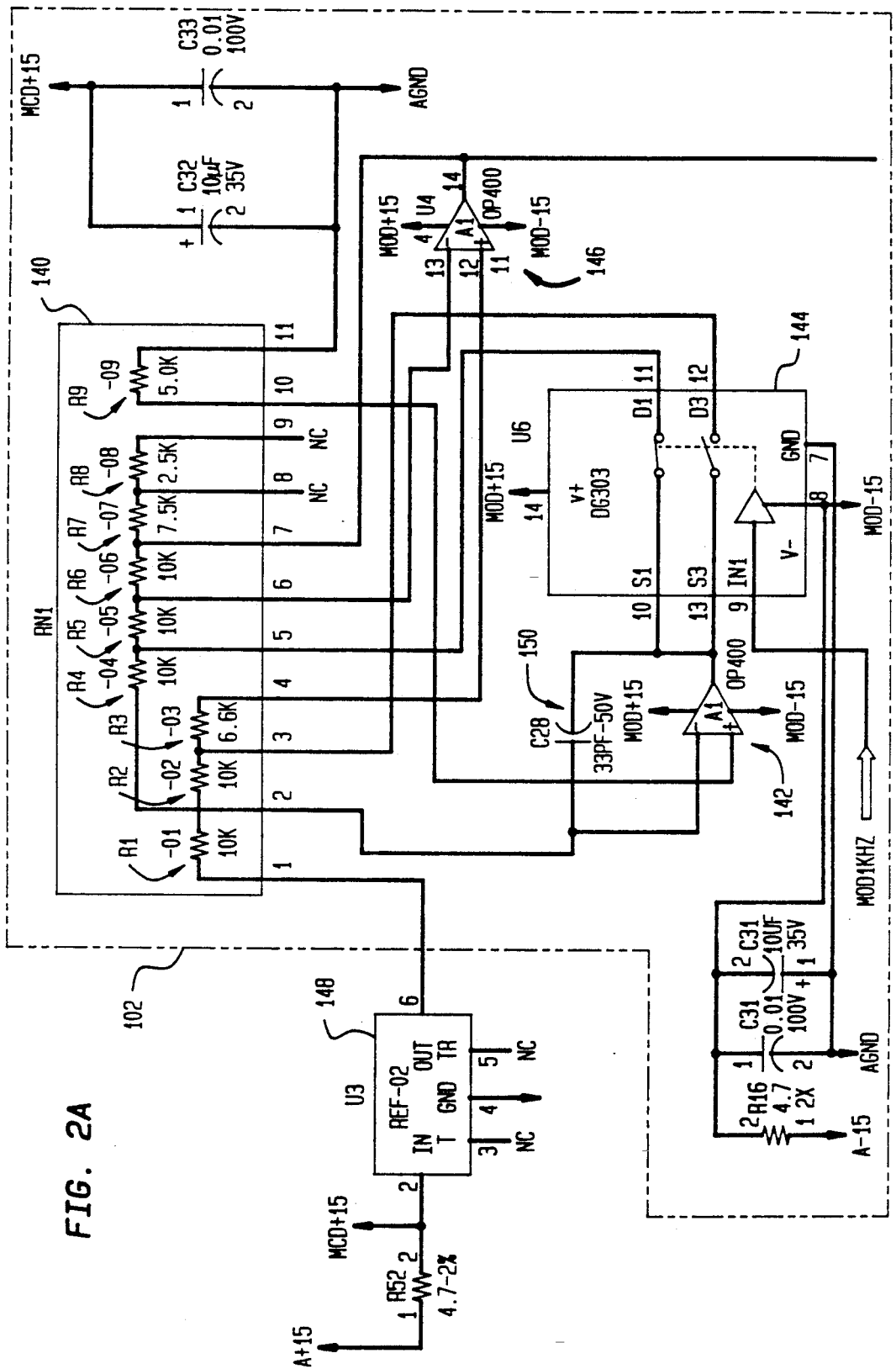
Figure 2B:
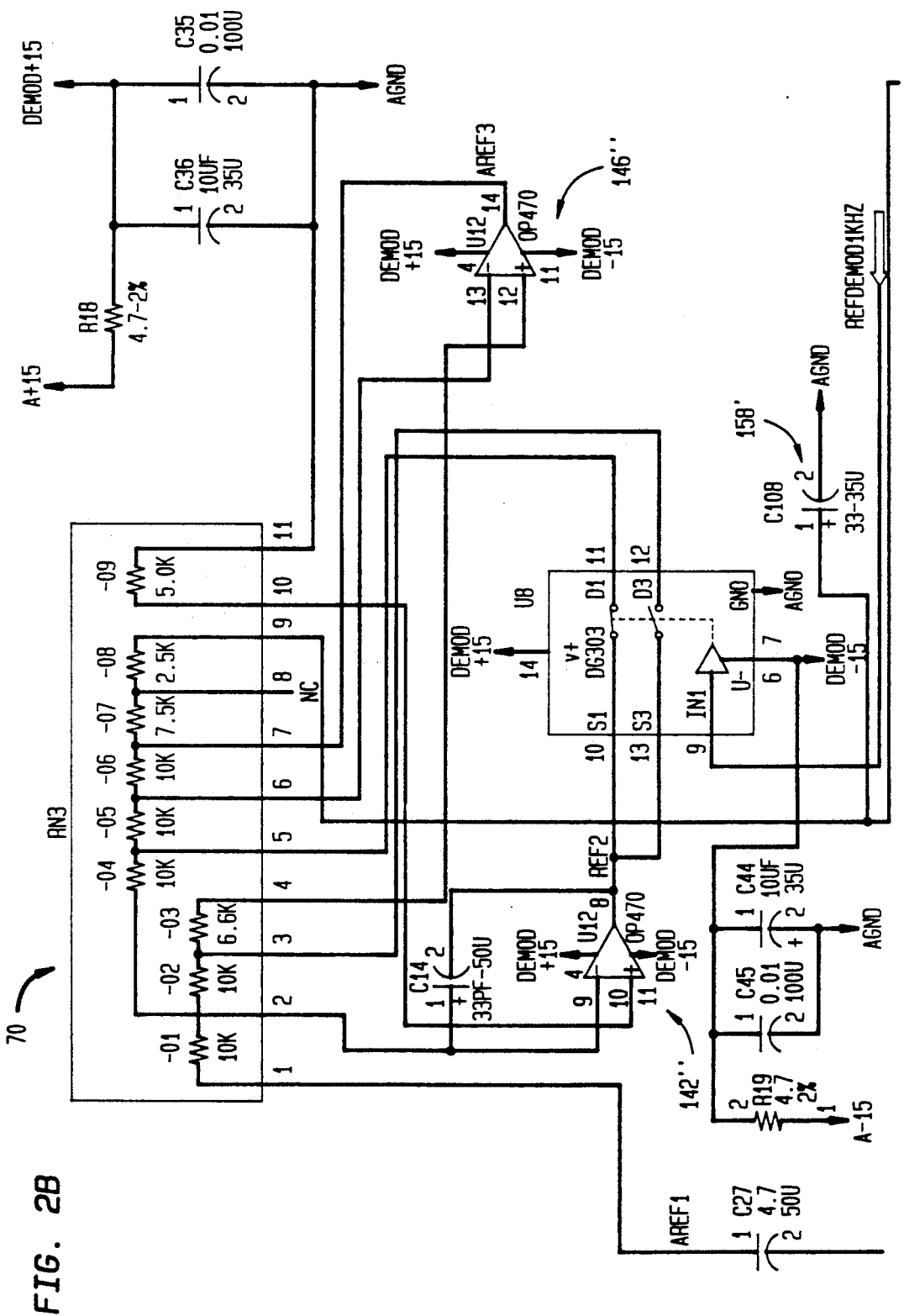
Figure 2C:
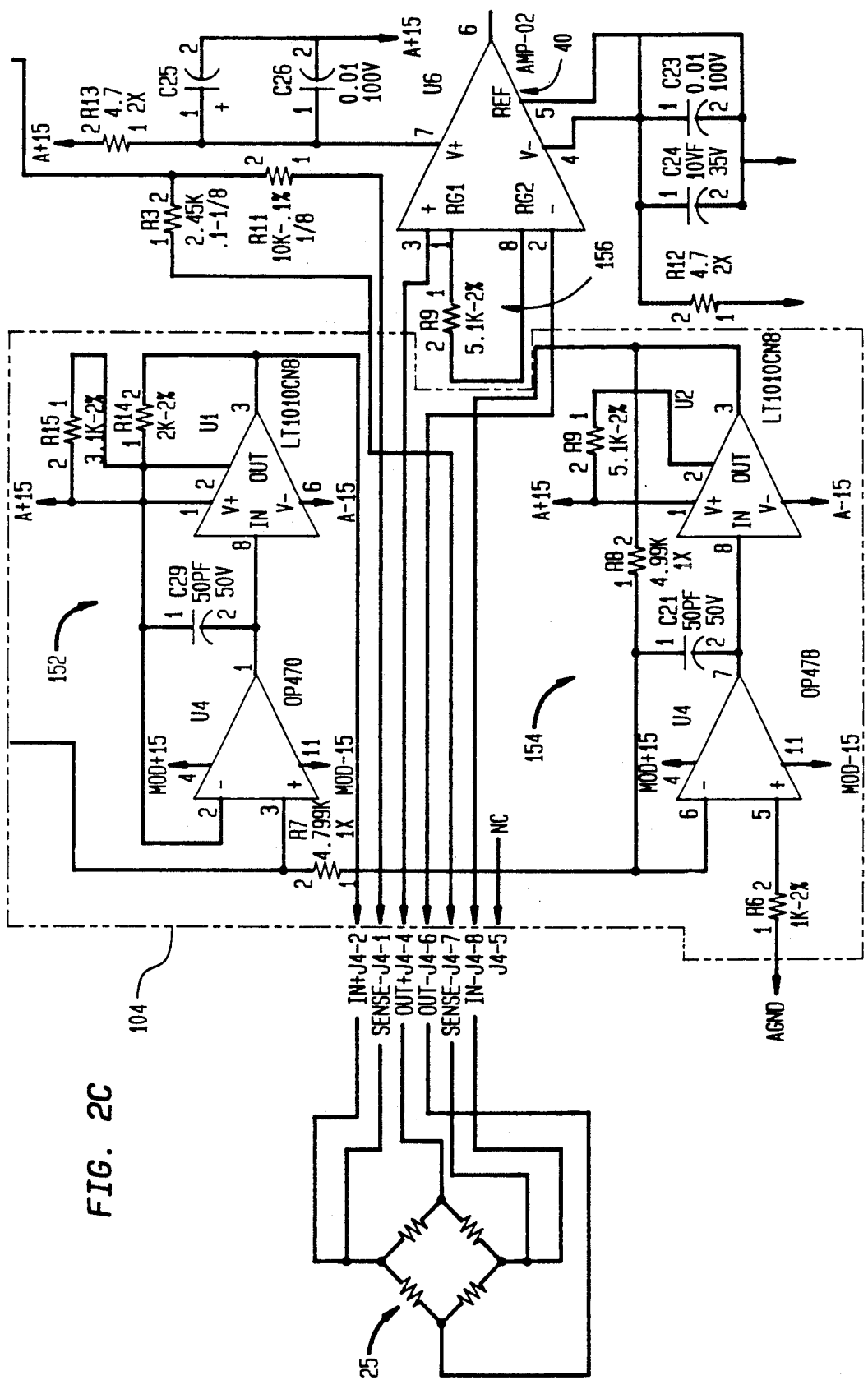

Corresponding to modulator excitation source 30 of FIG. 1 are modulator circuit 102 (FIG. 2A) and push pull amplifier stage 104 (FIG. 2C). Resistor bridge 25 is found on FIG. 2C, a.c. amplifier 40 on FIG. 2C, signal demodulator 50 on FIG. 2D, A/D converter 60 on FIG. 2E, and reference demodulator 70 on FIG. 2B. Timing generator 80 is realized by use of microcontroller 106 (FIG. 2F) which produces timing signals under software control. Divide-by-two driving stage 108 (FIG. 2G) also makes up part of the timing generator.

Figure 2D:
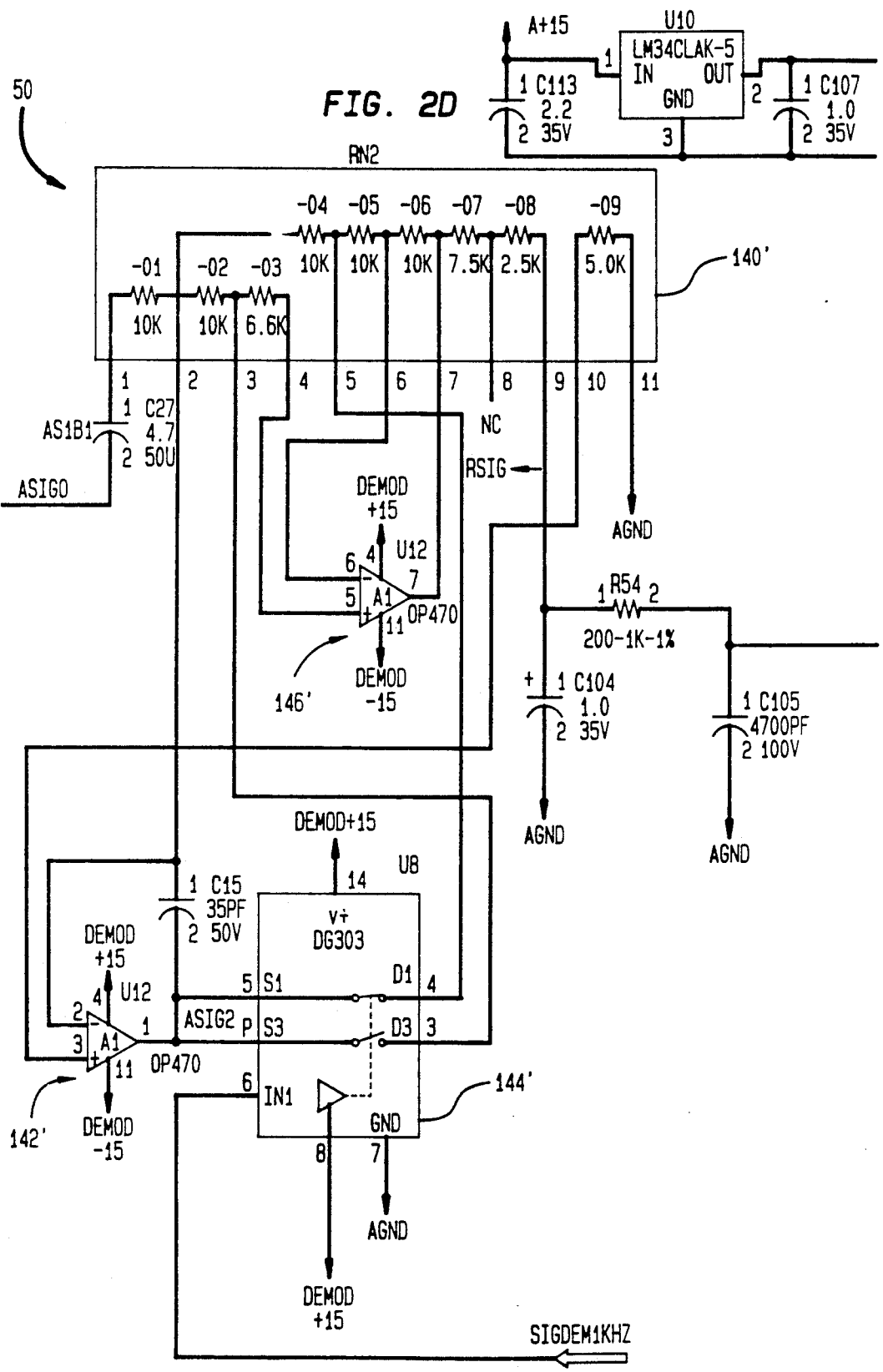
Figure 2E:
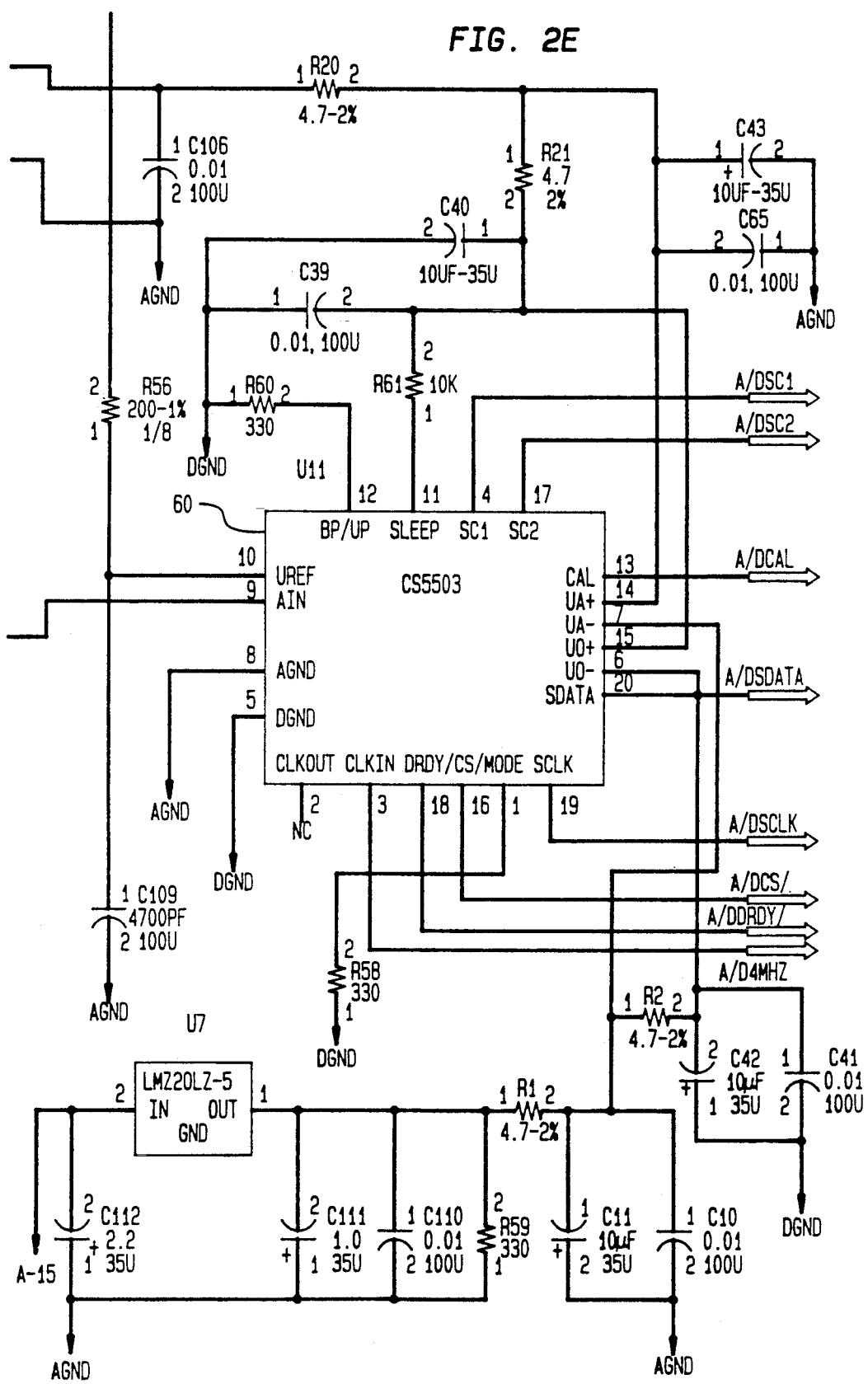

Microcontroller 106 may be, for example, a model 80C51FB available from Intel Corporation, Santa Clara, Calif. Associated with micro controller 106 are address latch 110, program ROM 112, and RAM 114 (FIG. 2I).

Address bus 116 and multiplexed address and data bus 118 interconnect microcontroller 106, latch 110, ROM 112 and RAM 114. Pull-up resistors 120 (FIG. 2F) are provided for bus. As will be recognized by those skilled in the art, the functions of microcontroller 106, ROM 112 and RAM 114 may alternatively be embodied in a single integrated circuit.

Figure 2F:
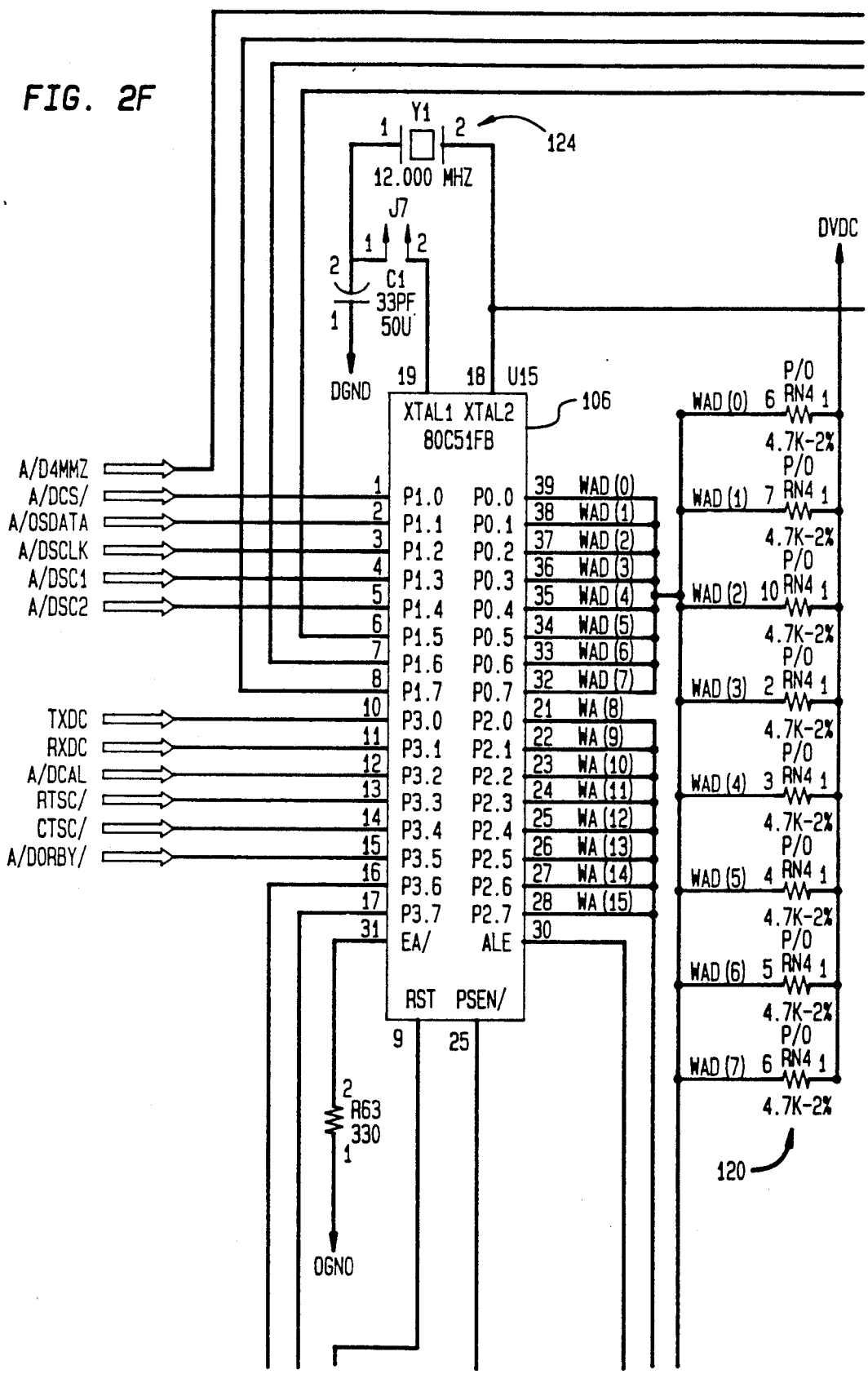
Figure 2G:
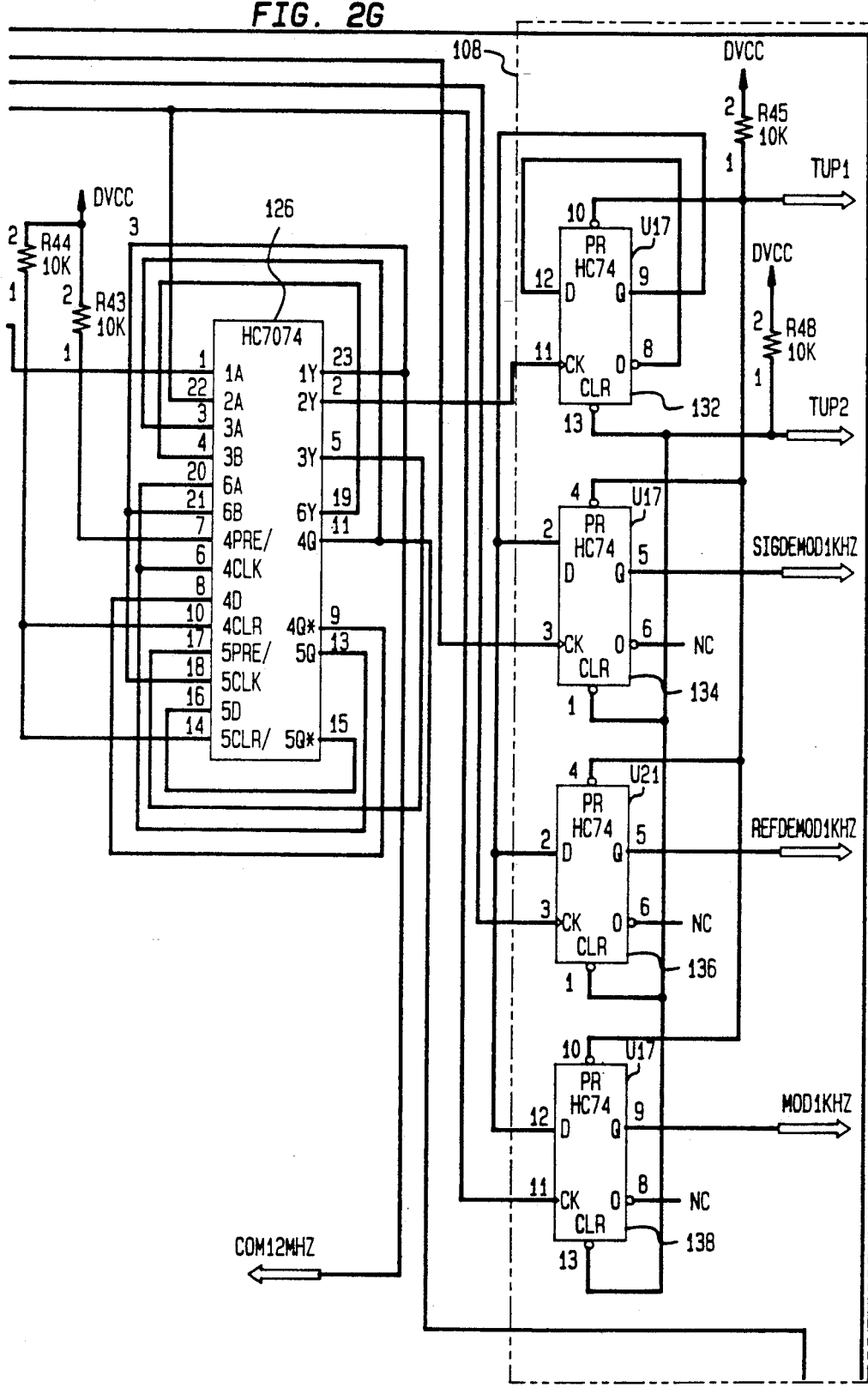
Figure 2H:
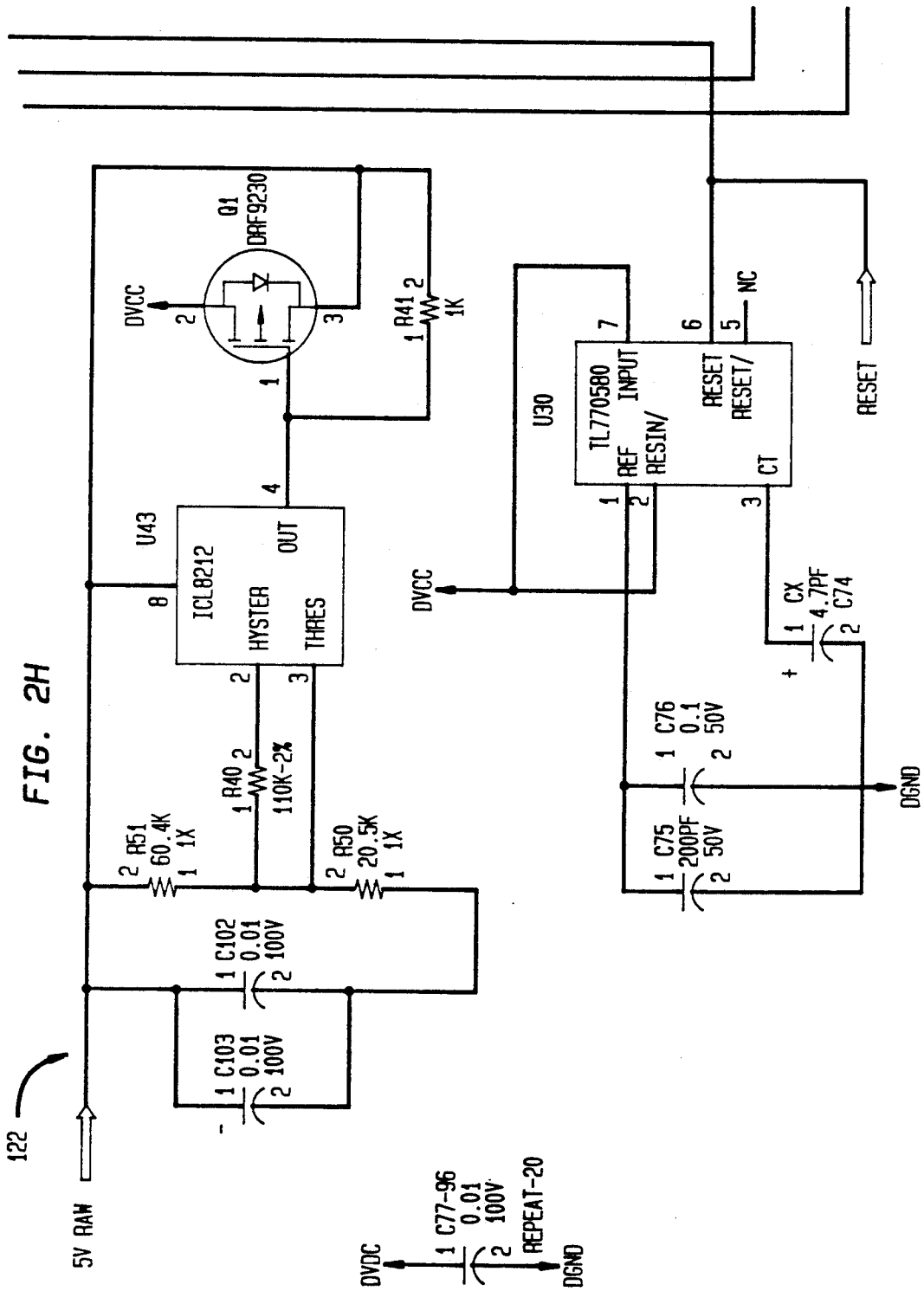
Figure 2I:
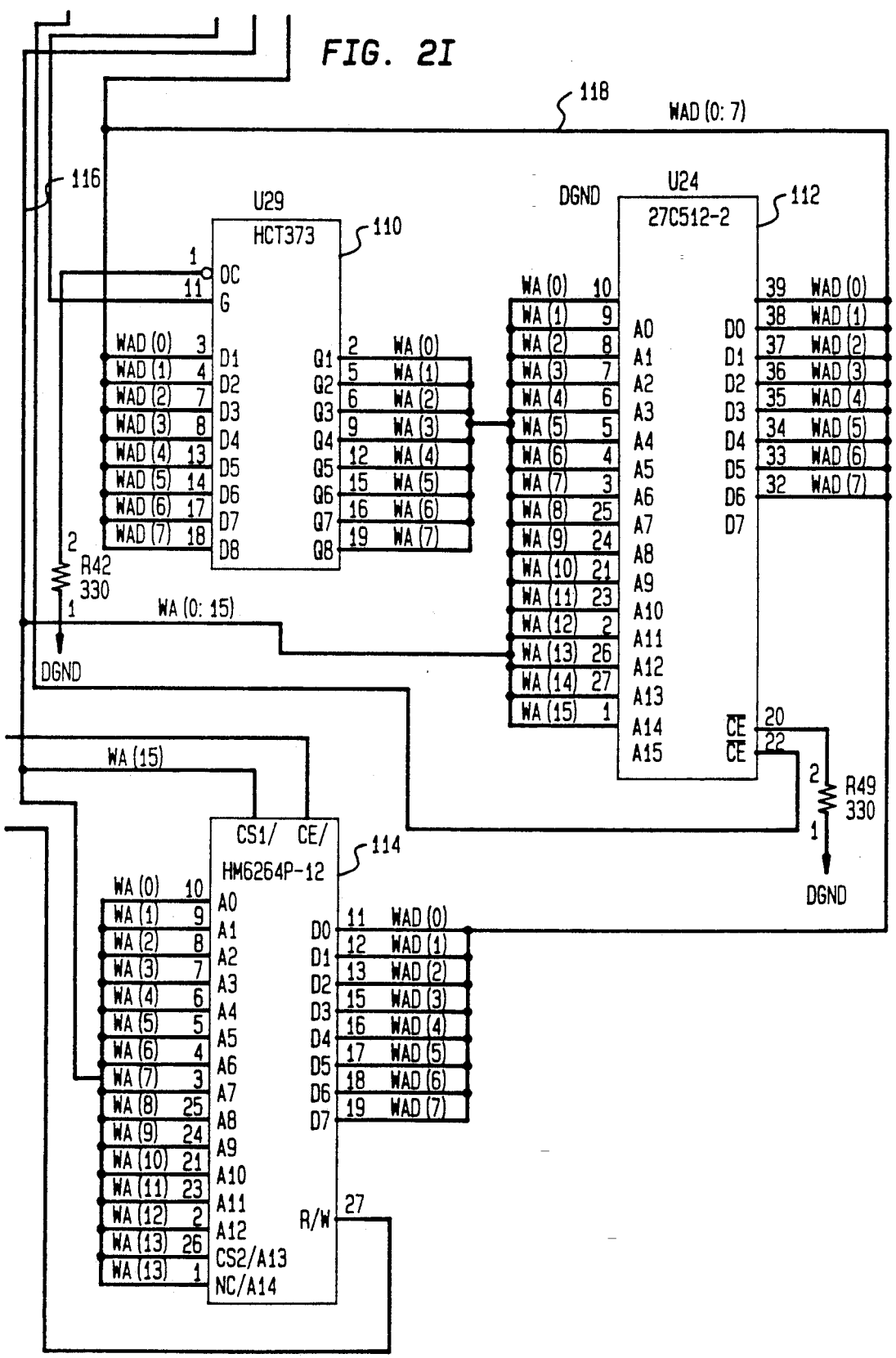

Also associated with microcontroller 106 are conventional start-up control circuitry 122 (FIG. 2H) and a crystal clock source 124 (FIG. 2F). Crystal 124 operates at 12 MHZ in the series resonant mode with a shunt capacitance on either leg for stability. Crystal 124 is the only clock source in device 10, thus eliminating beat frequency noise that might occur if more than one clock were present.

Figure 2J:
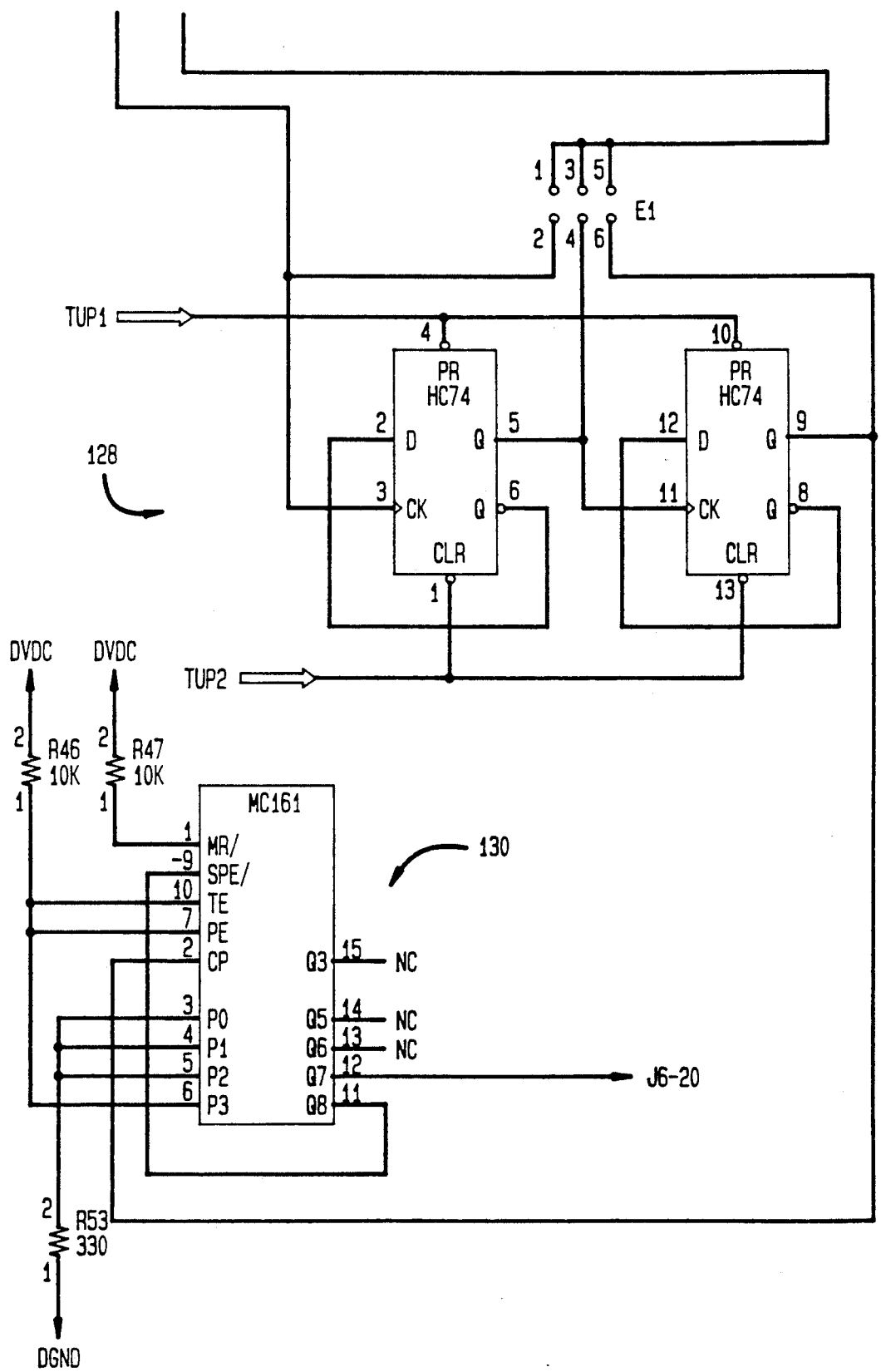

IC 126 (FIG. 2G) is connected to crystal 124 so as to provide a buffer for furnishing the 12 MHZ signal to the rest of the system. The input capacitance of the buffer provides the aforementioned shunt capacitance for one leg of crystal 124. IC 126 also comprises two D-type flip-flops, a NAND gate and a NOR gate arranged as a divide-by-three circuit in order to convert the 12 MHZ clock signal from crystal 124 into a 4 MHZ clock signal required by A/D converter 60. Also receiving the 4 MHZ clock signal are: frequency selector circuit 128 (FIG. 2J), which controls the bandwidth for the digital filter of A/D converter 60; and display clock driver 130 (FIG. 2J).

Data interpretation circuitry 90 of FIG. 1 is realized in part by microcontroller 106 which receives the output of A/D converter 60. Microcontroller 106 transmits data to a second microcontroller (not shown) which performs such functions as noise reduction and/or averaging and/or conversion to pounds or kilograms, etc. The second microcontroller may also be interfaced for communication of weight data to a microprocessor or other device that may use the weight data for such purposes as postal rate calculations.

Operation of force-measuring device 10 will now be discussed in detail, commencing with generation of modulator and demodulator timing signals by microcontroller 106 and driving stage 108.

Driving stage 108 (FIG. 2G) comprises D-type flip-flops 132, 134, 136, 138. A 2 KHZ clock signal output by microcontroller 106 is buffered by an inverter of IC 126 and then received at the clock input of flip-flop 132. Flip-flop 132 is arranged to change state upon each clock pulse. As a result, the output of flip-flop 132 cycles at a rate of 1 KHZ. The next state of flip-flops 134, 136, 138 is determined by the current state of flip-flop 132. The exact timing of the change of state of flip-flops 134, 136, 138 is determined by the receipt of clock pulses from microcontroller 106. Flip-flop 138 receives the same 2 KHZ clock signal that is applied to the aforesaid inverter of IC 126. Flip-flop 138 outputs a 1 KHZ square wave timing signal to modulator 102. Flip-flops 134, 136 respectively receive a second and a third 2 KHZ clock signal from microcontroller 106. Flip-flops 134, 36 respectively output 1 KHZ square wave timing signals to signal demodulator 50 and to reference demodulator 70.

As will be appreciated by those skilled in the art, each positive-going edge and each negative-going edge of the 1 KHZ signals output by flip-flops 134, 136, 138 occurs in response to a positive-going edge of the 2 KHZ clock signals respectively received by the three flip-flops. This arrangement assures symmetry of the 1 KHZ signals output by the three flip-flops.

As will also be appreciated, the relative timing of the 1 KHZ output signals may be adjusted by changing the relative timing of the three 2 KHZ clock signals produced by microcontroller 106. As was mentioned above, the timing of signals output by microcontroller 106 is subject to software control and so may be changed by reprogramming. In the embodiment disclosed herein, microcontroller 106 is programmed so that the respective outputs of flip-flop 134 (to signal demodulator 50) and flip-flop 135 (to reference demodulator 70), are in phase with each other and lag the output of flip-flop 138 (to modulator 102) by 34 microseconds, resulting in synchronous demodulation as discussed in more detail below.

Turning now to the operation of modulator 102 (FIG. 2A), it will be observed that modulator 102 includes precision resistor network 140, a first operational amplifier 142, a switching circuit 144 and a second operational amplifier 146.

Figure 3:
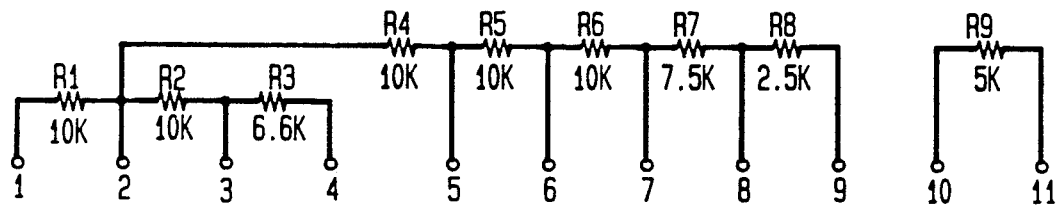
FIG. 3 is a detailed schematic representation of a resistor network making up part of the circuitry of FIGS. 2A–2J.

As shown in FIG. 3, resistor network 140 comprises resistors R1 through R9. The absolute tolerance of the resistors is 1%. The ratio tolerance is 0.1%. The change in ratio with temperature is no more than 5 parts per million per °C. over the range 0° C. to +70° C. The stringent tolerance for change in ratio is selected to aid in achieving the desired accuracy for device 10.

Amplifiers 142, 146 are preferably high gain operational amplifiers, with a gain of at least 5 million and may be, for example, model OP400 amplifiers available from Precision Monolithics, Inc., Santa Clara, Calif.

Switch 144 is preferably a double pole single throw FET switch and may be a type DG300 available from Intersil, Inc., Cupertino, Calif. or Harris Semiconductor division of Harris Corporation, Melbourne, Fla. Switch 144 is connected to resistor network 140, amplifier 142 and (through resistor network 140) to amplifier 146. Switch 144 is in a break before make configuration to eliminate transients. The rise and fall time of switch 144 is rapid, and in a preferred embodiment varies by no more than 12.5 nanoseconds from a nominal 250 nanoseconds over the temperature range of 0° C. to +70° C.

Figure 4A:
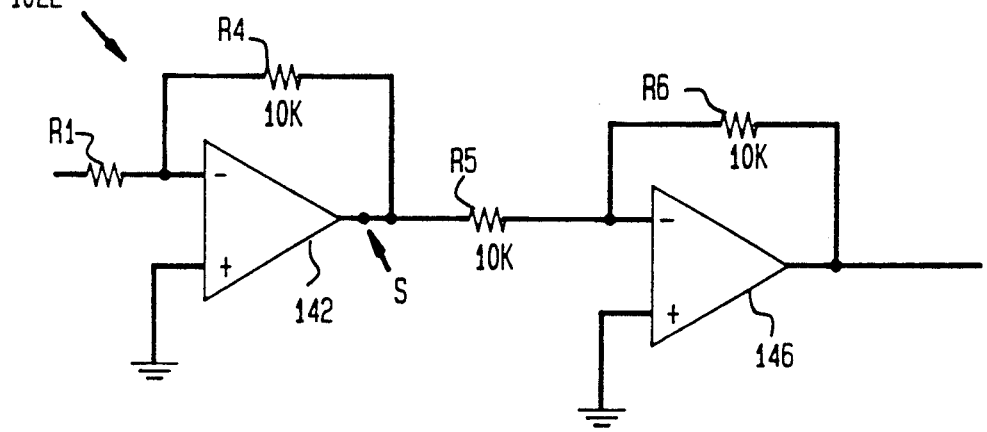
FIGS. 4A and 4B illustrate equivalent circuits to the two states of the modulator/demodulator circuit that makes up part of the circuitry of FIGS. 2A–2J.
Figure 4B:
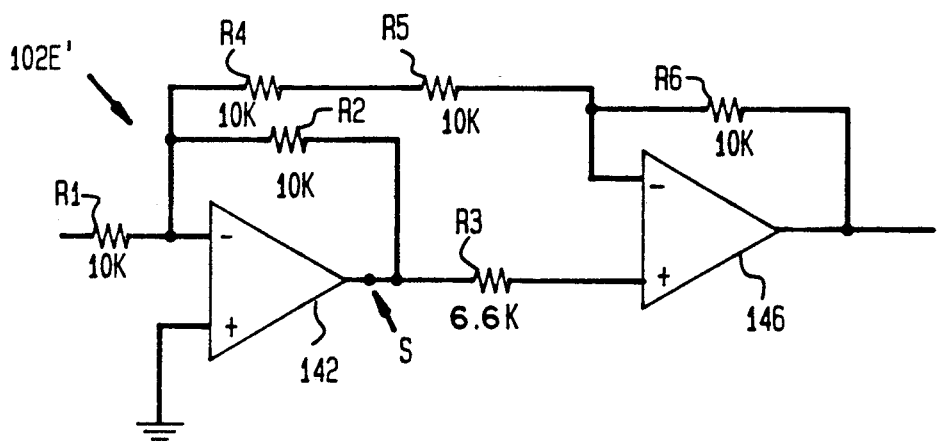

FIG. 4A is an illustration of an equivalent circuit (102E) to modulator 102 when switch 144 is in its first position (shown in FIG. 2A). FIG. 4B is an illustration of an equivalent circuit (102E') to modulator 102 when switch 144 is in its second position.

Referring to FIG. 4A, equivalent circuit 102E is seen to be a two stage amplifier, of which the first stage comprises operational amplifier 142 and resistors R1, R4, while the second stage comprises operational amplifier 146 and resistors R5, R6. The location of switch 144 in equivalent circuit 102E is shown by point S.

The gain for the first stage of circuit 102E is given by gain equation $$G_1 = -R4/R1 = -10k/10k = -1$$

The gain for the second stage of circuit 102E is given by $$G_2 = -R6/R5 = -10k/10k = -1$$

The total gain for circuit 102E is therefore $$G_T = G_1 * G_2 = -1 * -1 = 1$$

Turning now to FIG. 4B, equivalent circuit 102E' also is a two stage amplifier. The first stage comprises op amp 142 and resistors R1, R2, R4, R5. The second stage of circuit 102E' comprises op amp 146 and resistors R4, R5, R6. Resistor R3 may be disregarded because of the high input impedance of op amp 146. As in FIG. 4A, the location of switch 144 in equivalent circuit 102E' is shown by point S.

The gain for the first stage of circuit 102E' is given by $$\begin{aligned} G_1' &= -1/R1 * ((R4 + R5) * R2)/(R4 + R5 + R2)) \\ &= -/10 * ((10 + 10) * 10)/(10 + 10 + 10)) \\ &= -1/10 * (200/30) = -2/3 \end{aligned}$$

The gain for the second stage of circuit 102E' is given by $$\begin{aligned} G_2' &= 1 + (R6/(R4 + R5) \\ &= 1 + (10/(10 + 10) = +3/2. \end{aligned}$$

The total gain for circuit 102E' is $$G'_T = G'_1 * G'_2 = -\tfrac{2}{3} * 3/2 = -1$$

It will be noted that changes in the position of switch 144 change the effective gains of op amps 142, 146.

In operation, modulator 102 receives a precision 5 volt d.c. potential from reference voltage generator 148 (FIG. 2A). The +5 V potential is applied to the inverting input of amplifier 142 through resistor R1. The 1 KHZ timing signal from flip-flop 138 is applied to switch 144. Switch 144 changes its position on each positive and negative edge of the 1 KHZ timing signal, so that switch 144 is repeatedly driven between its first and second positions in a 1 KHZ cycle. When switch 144 is in its first position, the total gain of modulator 102 is +1, so that the output potential of amplifier 146 (which also may be considered the output of modulator 102) is equal to the input potential +5 V. When switch 144 is in its second position, the total gain of modulator 102 is −1 so that the output potential of amplifier 146 is equal to −5 V, which is minus one times the input potential. As a result of the 1 KHZ timing signal applied to switch to switch 144, the output of modulator 102 is a precision 1 KHZ a.c. square wave of amplitude 10 volts, peak to peak.

Referring again to FIGS. 4A, 4B or to FIG. 2A, it will be noted that switch 144, in either position is within the feed back loop of amplifier 142. This positioning demultiplies the on resistance of switch 144 by amplifier 142's open loop gain, which is a factor of at least five million.

Also to be noted is 33 pF capacitor 150 which is connected across the output and the inverting input of amplifier 142. Capacitor 150 stabilizes amplifier 142 during transitions of switch 144 (50 nanoseconds worst case). Capacitor 150 also stabilizes the rise and fall time of the square wave output over variations in component characteristics due to time and temperature.

Push-pull amplifier stage 104 receives the square wave output from modulator 102 and applies it in a balanced manner to resistor bridge 25. Amplifier stage 104 comprises noninverting driving circuit 153 and inverting driving circuit 154. The noninverted square wave output by circuit 152 is applied to the positive input of resistor bridge 25 and the inverted square wave output by circuit 154 is applied to the negative input of resistor bridge 25. The respective 10 V square waves are 180° out of phase and so are applied in a push-pull arrangement to resistor bridge 25, thereby developing an effective peak-to-peak differential of 20 volts across the input terminals of bridge 25 and resulting in twice the sensitivity of a system in which a push-pull five volts d.c. might be used. Also because of the balanced excitation the average output voltage of bridge 25 is essentially zero, which minimizes common mode voltage problems at the input of a.c. amplifier 40.

The differential output of bridge 25 is essentially a 1 KHZ square wave that is 180° out of phase with the excitation signal applied to bridge 25. The output of bridge 25 is applied to the inputs of amplifier 40. Amplifier 40 is preferably an instrumentation amplifier such as the model AMPφ2 available from Precision Monolithics, Inc., Santa Clara, Calif., or the model AD624 available from Analog Devices, Inc., Norwood, Mass. Connected to amplifier 40 is gain-setting resistor 156. The value of resistor 156 is selected to produce the desired gain for amplifier 40. In the preferred embodiment, the full scale output of bridge 25 is 40 mV peak to peak and, as will be seen, the full scale input voltage of the A/D converter used in the preferred embodiment is 2.5 V d.c. A gain of 125 is needed at amplifier 40, so that the full scale output of amplifier 40 will be 5 volts peak to peak for demodulation by demodulator 50 to a 2.5 V d.c. output at full scale. Resistor 156 is chosen to produce a gain of 125 at amplifier 40. Resistor 156 is also chosen to have a temperature coefficient that matches the temperature coefficient of amplifier 40 so that the gain remains essentially constant over changes in temperature in the intended range of operation.

The output of amplifier 40 is applied to the input of signal demodulator 50 (FIG. 2D). As will be observed by comparison of demodulator 50 with modulator 102, the circuits are substantially identical, the largest difference being in the selection of amplifiers 142', 146' of demodulator 50, which correspond to amplifiers 142, 146 of modulator 102. Amplifiers 142', 146' are selected so as to have a rise and fall time that is substantially faster, say by a factor of ten or twenty, than the rise and fall time of amplifiers 142, 146. The high relative slew rate of the amplifiers of demodulator 50 prevents the nonlinearities that would result from slew rate saturation if the rise and fall time of amplifiers 142', 146' were matched to that of amplifiers 142, 146. In a preferred embodiment, amplifiers 142', 146' are model OP470 amplifiers available from Precision Monolithics, Inc., Santa Clara, Calif. The model OP470 has a rise and fall time of 350 nanoseconds; the model OP400 selected for amplifiers 142, 146 has a rise and fall time of 7 microseconds.

The timing signal applied to switch 144 of demodulator 50, as mentioned before, lags the timing signal modulator 102 by 34 microseconds. This delay exactly compensates for the delay between modulator 102 and demodulator 50. Since the 1 KHZ square wave input signal received by demodulator 50 from amplifier 40 is 180° out of phase with the timing signal, demodulator 50 synchronously demodulates its input signal, applying a gain of minus one to the negative leg of the input signal and a gain of plus one to the positive leg of the input signal. The output of amplifier 146' is thus essentially a d.c. voltage of an amplitude that represents the force applied to load cell 20. The output of amplifier 146' passes through a low pass filter stage comprising resistors R7' and R8' and capacitor 158. The corner frequency of the filter is at 15 HZ. This greatly attenuates the 2 KHZ switch component of the output of amplifier 146'. Further, any low frequency or d.c. interference signals, such as power line interference, 1/f noise, amplifier offset, board noise, or thermoelectric effects that are input to demodulator 50 will have been mixed to 1 KHZ and will also be greatly attenuated by the low pass filter. Further filtering of high frequency noise is provided by a second filter stage.

The filtered output of signal demodulator 50 is applied to the analog input of A/D converter 60, which is preferably of the Delta Sigma type and may for example be a Model CS5503 available from Crystal Semiconductor Corporation, Austin, Tex. This device also incorporates substantial low pass filtering that provides very large attenuation of power line interference and system AC components (1 KHZ and harmonics). The full scale input of A/D converter 60 is 2.5 volts. The output of A/D converter 60, communicated serially to microcontroller 106, is a 20 bit binary word representing the amplitude of the d.c. signal received from signal demodulator 50.

The reference voltage for A/D converter 60 is provided by reference demodulator 70. The input terminal of demodulator 70 is coupled to sense terminals at the input terminal of bridge 25. The coupling of bridge 25 to demodulator 70 is through resistor network 160, which divides and inverts the excitation signals applied to bridge 25, resulting in an input to reference demodulator 70 that is an a.c. square wave, 5 volts in amplitude peak to peak and 180° out of phase with the bridge excitation signal.

Reference demodulator 70 is again virtually the same circuit as modulator 102, except that amplifiers 142" and 146" of reference demodulator 70 are relatively fast-slewing amplifiers like those of signal demodulator 50. Like signal demodulator 50, reference demodulator 70 receives a 1 KHZ timing signal that lags by 34 microseconds the timing signal for modulator 102. Reference demodulator 70 synchronously demodulates its 5 volt square wave input, thereby outputting a 2.5 volt d.c. potential. As before, the synchronous demodulation of the input signal of reference demodulator 70 mixes low frequency interference to 1 KHZ, for subsequent filtering. The first low pass filter after reference demodulator 70 differs from the filter after signal demodulator 50 in that capacitor 158', associated with reference demodulator 70, has a different value from capacitor 158, so that demodulator 70's first filter has a corner frequency at 0.33 Hz. As in the case of demodulator 50, a second low pass filter further attenuates high frequency noise.

As will be appreciated by those skilled in the art, the force-measuring device disclosed herein enjoys the advantages of being relatively accurate, sensitive, inexpensive to produce, and unaffected by electrical interference. For example, use of largely identical circuits for the modulator, the signal demodulator and the reference demodulator results in cost savings. As another example, amplifier 40 can be a relatively inexpensive amplifier because d.c. stability is not required.

The embodiment as disclosed herein has been provided only by way of illustration, and as will be readily recognized by those skilled in the art, many other embodiments are within the scope of the subject invention. Among these are a temperature measuring device utilizing a thermistor bridge that is a.c. square wave excited, and a displacement measuring device utilizing an a.c. square wave excited LVDT. Accordingly, limitations on the subject invention are to be found only in the claims set forth below.

I claim:
1. An apparatus for measuring a force, comprising:
 (a) a transducer, said transducer comprising a strain gauge;
 (b) excitation means for applying an excitation a.c. voltage to said transducer, said voltage having a wave form, said wave form being essentially a square wave; said transducer outputting a data signal, said signal representing a force applied to said strain gauge;
 (c) signal amplifying means for receiving said data signal and amplifying said data signal, said amplifying means outputting an amplified data signal, said amplified data signal essentially having the form of an a.c. square wave, the amplitude of said a.c. square wave being modulated by said applied force;
 (d) signal demodulating means, for synchronously demodulating said amplified data signal and outputting a demodulated signal, said demodulated signal being essentially a d.c. voltage, the amplitude of said d.c. voltage being modulated by said applied force;
 (e) first low pass filter means for filtering noise from said demodulated signal; and
 (f) an analog-to-digital converter (A/D converter) for receiving said filtered demodulated signal and outputting a digital word representative of said filtered demodulated signal; said excitation means comprising a circuit for modulating an input potential, said circuit comprising:
  (i) first amplifying means for receiving said input potential;
  (ii) second amplifying means for outputting an output potential;
  (iii) a resistor network connected to said first and second amplifying means;
  (iv) switching means for changing an effective gain of at least one of said amplifying means, said switching means having a first position and a second position, said switching means being connected to said resistor network and to at least one of said amplifying means; and
  (v) means for repeatedly driving said switching means between said first position and said second position;

said output potential equalling said input potential when said switching means is in said first position; said output potential equalling minus one times said input potential when said switching means is in said second position; said signal demodulating means including first and second amplifying means and said signal demodulating means and said modulating circuit being substantially identical, except that said first and second amplifying means of said signal demodulating means have a substantially faster slew rate than said first and second amplifying means of said modulating circuit.

2. The apparatus of claim 1, further comprising:
(g) reference demodulating means for receiving and synchronously demodulating an a.c reference voltage and outputting a reference potential; and
(h) second low pass filter means for filtering noise from said reference potential;
said A/D converter receiving said filtered reference potential.

3. The apparatus of claim 2, wherein said reference demodulating means has first and second amplifying means and said reference demodulating means, said signal demodulating means and said modulating circuit are substantially identical, except that said first and second amplifying means of said reference and signal demodulating means have a substantially faster slew rate than said first and second amplifying means of said modulating circuit.

4. The apparatus of claim 3, further comprising timing means for controlling the timing of said reference demodulating means, said signal demodulating means and said modulating circuit; and
data interpretation means for receiving and interpreting said digital word.

5. An apparatus for measuring a force, comprising;
(a) a transducer, said transducer comprising a strain gauge;
(b) excitation means for applying an excitation a.c. voltage to said transducer, said voltage having a wave form, said wave form being essentially a square wave; said transducer outputting a data signal, said signal representing a force applied to said strain gauge;
(c) signal amplifying means for receiving said data signal and amplifying said data signal, 6. The apparatus of claim 5, wherein said reference demodulating means and said signal demodulating means are substantially identical.

7. The apparatus of claim 6, wherein said excitation means comprises a circuit for modulating an input potential and wherein said modulating circuit, said reference demodulating means and said signal demodulating means are substantially identical, except that said first and second amplifying means of said reference and signal demodulating means have a substantially faster slew rate than said first and second amplifying means of said modulating circuit.

8. The apparatus of claim 5 further comprising means for coupling an input terminal of said strain gauge to an input of said reference demodulating means, said reference demodulating means receiving an a.c. square wave input signal that is derived from said excitation a.c. voltage.

9. The apparatus of claim 1, wherein said excitation means comprises a push-pull amplifying stage.

10. The apparatus of claim 9, wherein said excitation means comprises a circuit for modulating an input potential, said circuit comprising:
(i) first amplifying means for receiving said input potential;
(ii) second amplifying means for outputting an output potential;
(iii) a resistor network connected to aid first and second amplifying means;
(iv) switching means for changing an effective gain of at least one of said amplifying means, said switching means having a first position and a second position, said switching means being connected to said resistor network and to at least one of said amplifying means; and
(v) means for repeatedly driving said switching means between said first position and said second position;
said output potential equalling said in-put potential when said switching means is in said first position; said output potential equalling minus one times said input potential when said switching means is in said second position.

11. A force-measuring apparatus, comprising
(a) a d.c. potential source, said source supplying a first reference potential;
(b) a circuit for modulating said first reference potential, said modulating circuit outputting square wave signal;
(c) a strain gauge;
(d) push-pull stage means for applying said square wave signal in a push-pull arrangement to said strain gauge;
(e) signal amplifier means for receiving a force signal from said strain gauge and for amplifying said force signal, said force signal representing a force applied to said strain gauge;
(f) signal demodulating means for receiving an amplified force signal from said signal amplifier means and for synchronously demodulating said amplified force signal and outputting a demodulated force signal;
(g) first low pass filtering means, for filtering noise from said demodulated force signal;
(h) analog-to-digital converter means for receiving a filtered demodulated force signal and for outputting a digital word representative of said filtered, demodulated force signal;
(i) data interpretation means for receiving and interpreting said digital word;
(j) reference demodulating means for receiving an a.c. reference signal from said push-pull stage means and for synchronously demodulating said a.c. reference signal, said reference demodulating means outputting a second reference potential;
(k) second low pass filtering means, for filtering noise from said second reference potential and for providing a filtered reference potential to said analog-to-digital converter means; and
(l) timing means for controlling said modulating circuit, said signal demodulating means and said reference demodulating means.

12. The apparatus of claim 11, wherein said modulating circuit, said signal demodulating means and said reference demodulating means each comprise:
(i) first amplifying means for receiving an input potential;

(ii) second amplifying means for outputting an output potential;

(iii) a resistor network connected to said first and second amplifying means;

(iv) switching means for changing an effective gain of at least one of said amplifying means, said switching means having a first position and a second position, said switching means being connected to said resistor network and to at least one of said amplifying means; and (v) means for repeatedly driving said switching means between said first position and said second position;

said output potential equalling said input potential when said switching means is in said first position; said output potential equalling minus one times said input potential when said switching means is in said second position.

13. The apparatus of claim 11 wherein said timing means comprises programmable means for generating timing signals under software control, said timing signals comprising a modulator timing signal for controlling said modulator circuit, a signal demodulator timing signal for controlling said signal demodulating means and a reference demodulator timing signal for controlling said reference demodulating means, said demodulator timing signals being delayed with respect to said modulator timing signal.

14. A method of generating a signal representative of a force comprising the steps of:

exciting a transducer with an a.c. square wave, said transducer comprising a strain gauge;

applying a force to said strain gauge;

synchronously demodulating an output signal of said transducer, said output signal representing said physical quantity;

filtering said demodulated output signal;

synchronously demodulating an a.c. reference signal so as to produce a d.c. reference potential;

filtering said reference potential;

applying said reference potential to an analog to digital converter; and converting said filtered output signal into a digital signal by means of said analog to digital converter.

15. The method of claim 14, wherein said excitation step comprises applying an a.c. square wave to said strain gauge in a push-pull arrangement.

* * * * *